US009965818B2

(12) United States Patent
Panczenko et al.

(10) Patent No.: US 9,965,818 B2
(45) Date of Patent: May 8, 2018

(54) INFERENCE OF TIMESTAMP, LOCATION, AND SIGNATURE INFORMATION USING STATISTICAL SIGNAL PROCESSING OF POWERLINE DATA

(71) Applicant: LOCKHEED MARTIN CORPORATION, Bethesda, MD (US)

(72) Inventors: Michael Panczenko, Ellicott City, MD (US); Alexander Gregory Hrybyk, Linthicum, MD (US); Kwok Lee Tang, Ellicott City, MD (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 938 days.

(21) Appl. No.: 14/459,915

(22) Filed: Aug. 14, 2014

(65) Prior Publication Data
US 2015/0052073 A1 Feb. 19, 2015

Related U.S. Application Data

(60) Provisional application No. 61/866,208, filed on Aug. 15, 2013.

(51) Int. Cl.
*H04N 9/80* (2006.01)
*G06Q 50/26* (2012.01)
*G06F 17/30* (2006.01)

(52) U.S. Cl.
CPC ..... *G06Q 50/265* (2013.01); *G06F 17/30743* (2013.01); *G06F 17/30784* (2013.01)

(58) Field of Classification Search
CPC .......................... G06C 50/265; G06F 1/30353
(Continued)

(56) References Cited

U.S. PATENT DOCUMENTS 7,941,379 B1 5/2011 Newstadt et al.
8,068,638 B2 11/2011 Malone et al.
(Continued)

FOREIGN PATENT DOCUMENTS

CN 202120306 1/2012

OTHER PUBLICATIONS

Garg et al, "Geo-location estimation from Electrical Network Frequency signals" published in Acoustics, Speech and Signal Processing (ICASSP), 2013 IEEE International conference on May 26, 2013-May 31, 2013.

*Primary Examiner* — Robert Chevalier
(74) *Attorney, Agent, or Firm* — McDermott Will & Emery LLP

(57) ABSTRACT

Systems and methods for applying Electric Network Frequency (ENF) forensic techniques to determine characteristics associated with an audio and/or video recording such as when and where the recording was made. In one embodiment, a system that determines at least one of a time and a location associated with a recording includes an ENF forensic database, an ENF extraction processing module and a comparison processing module. The ENF forensic database stores powerline data collected from at least one electrical power grid. The ENF extraction processing module extracts ENF content coupled into the recording. The comparison processing module compares the extracted ENF content with powerline data retrieved from the ENF forensic database and outputs information including one or more of a time during which the recording was made and a location where the recording was made based on the comparison with the powerline data.

19 Claims, 3 Drawing Sheets

(58) Field of Classification Search
USPC ................ 386/239, 240, 242, 248, 323, 326
See application file for complete search history.

(56) References Cited

U.S. PATENT DOCUMENTS

| | | |
|---|---|---|
| 8,094,034 B2 | 1/2012 | Patel et al. |
| 8,198,998 B1 | 1/2012 | Propp et al. |
| 8,155,326 B2 | 4/2012 | Schweitzer, III et al. |
| 8,334,784 B2 | 12/2012 | Patel et al. |
| 2009/0304101 A1* | 12/2009 | LoPorto ................ G01D 4/004 375/260 |
| 2011/0038594 A1 | 2/2011 | Symons et al. |
| 2012/0093240 A1 | 4/2012 | McFarland et al. |

* cited by examiner

INFERENCE OF TIMESTAMP, LOCATION, AND SIGNATURE INFORMATION USING STATISTICAL SIGNAL PROCESSING OF POWERLINE DATA

RELATED APPLICATION INFORMATION

This application claims priority from U.S. Provisional Application Ser. No. 61/866,208, entitled "INFERENCE OF TIMESTAMP, LOCATION, AND SIGNATURE INFORMATION USING STATISTICAL SIGNAL PROCESSING OF POWERLINE DATA", and filed Aug. 15, 2013. The entirety of this application is incorporated herein by reference.

FIELD OF THE INVENTION

The present invention relates generally to the analysis of audio and/or video recordings, and more particularly, to identifying characteristics of audio and/or video recordings such as when and where a recording was made.

BACKGROUND OF THE INVENTION

With the increasing availability of relatively inexpensive and easily operated recording devices as well as widely accessible Internet enabled distribution technologies, audio, video and audio-visual recordings have become an increasingly popular manner for individuals, groups, and governments to distribute information to others. Various local and national government agencies (e.g., law enforcement, homeland security), as well as corporations and other businesses, may want to obtain information about various characteristics of such recordings. For example, it may be desirable to determine where and when the recording was made. Sometimes such information can be directly discerned from the recording itself, for example, by the presence of corroborating material present in the recording (e.g., a recent edition of a newspaper seen next to the image of a kidnap victim) or from metadata accompanying the recording. However, in many circumstances, such information is not readily available and other manners of determining where and when the recording may need to be utilized.

SUMMARY OF THE INVENTION

Accordingly, systems and methods for applying Electric Network Frequency (ENF) forensic techniques to determine characteristics associated with an audio and/or video recording such as when and where the recording was made are provided. In this regard, ENF analysis techniques may be used to determine when a recording of audio and/or video was made. For example, power lines may transmit artifacts that can be used to determine when an audio and/or video recording was made. Constantly changing electric fields may produce a unique fingerprint of a local power grid. These fingerprints may couple onto cell phones, video cameras, etc., and may be recorded when such devices are used to make an audio and/or video recording.

Accordingly, ENF Forensics may provide a way for intelligent targeting attribution and network fingerprinting. There is a need for the ability to provide target attribution and network fingerprinting for intelligence and forensics exploitation and targeting purposes. Capabilities of the ENF Forensics may exploit emanations from power lines that have been electromagnetically coupled on to audio and video recordings and transmissions to derive information about when and where the recording was made.

The present disclosure utilizes algorithms that extract these hidden emanations and compare them against a database of ground truth power line data to determine when a recording was made. Additionally, advanced statistical signal processing techniques may be used to determine a fingerprint of extracted powerline emanations. The fingerprint may be used to determine where a recording was made. The present disclosure further includes geolocation techniques to determine differences in position within a given room. This is highly useful for indoor tracking or localization. Finally, these techniques may be used to identify certain classes of electronics that are in a given area.

The capability to exploit power line noise to determine previously unknown information about targets, may include: timestamp and geostamp of a recorded piece of audio or video, determining occurrence of large societal events, identifying make/model of devices plugged in to the network, and other such uses. Advanced techniques may be exploited in power line analysis to create a new way to enhance forensics investigations, intruder/attack tracing, and asset verification. Successfully developing such a capability significantly advances operations and provides a solution where none currently exists.

The techniques of the present disclosure enable users to identify not just when a recording was made, but also where it was made. Furthermore, a worldwide sensor network and distributed computing systems enable a level of scalability and performance that no other ENF Forensic solution has.

A method and system for inference of timestamp, location, and signature identification using statistical signal processing of power line data may include determining unique power-grid related fingerprints embedded in audio/video, which may be used to correlate when and where a recording was made.

Algorithms may be utilized to extract hidden emanations and compare them against a database of ground truth power line data (e.g., by executing instructions via a computer processor). Basic correlation determines when a recording was made. Advanced statistical signal processing techniques may be used to determine a fingerprint of extracted power line emanations and to determine where a recording was made. Furthermore, these techniques may be used to identify certain classes of electronics that are in a given area.

These techniques create a new way to enhance forensics investigations, intruder/attack tracing, and asset verification. Such a capability significantly advances operations and provides a solution where none currently exists.

Various aspects, features and advantages of the ENF Forensic system and method may be suitable for law enforcement, power utility companies, Internet security companies (for authentication of host/server locations), and/or Advanced Two Factor authentication, to name a few.

In one aspect, a system that determines at least one of a time and a location associated with a recording includes an ENF forensic database, an ENF extraction processing module and a comparison processing module. The ENF forensic database stores powerline data collected from at least one electrical power grid. The powerline data may comprise a plurality of data points representing changes within electric fields associated with at least one electrical power grid over time and may include at least one of information indicative of times at which specific data points were obtained and information identifying a location in the at least one electrical power grid from which the specific data points were obtained. The ENF extraction processing module extracts ENF content coupled into the recording. The comparison processing module compares the extracted ENF content with powerline data retrieved from the ENF forensic database and outputs information including one or more of a time during which the recording was made and a location where the recording was made based on the comparison with the powerline data.

In another aspect, a method for determining at least one of a time and a location associated with a recording may include storing powerline data collected from at least one electrical power grid in an ENF forensic database. The powerline data may comprise a plurality of data points representing changes within electric fields associated with the at least one electrical power grid over time and may include at least one of information indicative of times at which specific data points were obtained and information identifying a location in the at least one electrical power grid from which the specific data points were obtained. The method may also include processing the recording to extract ENF content coupled into the recording. The method may further include comparing the extracted ENF content with powerline data retrieved from the ENF forensic database. The method may additionally include outputting information including one or more of a time at which the recording was made and a location where the recording was made based on the comparison with the powerline data.

Various refinements exist of the features noted in relation to the various aspects of the present disclosure. Further features may also be incorporated in the various aspects of the present disclosure. These refinements and additional features may exist individually or in any combination, and various features of the various aspects may be combined. These and other aspects and advantages of the present disclosure will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
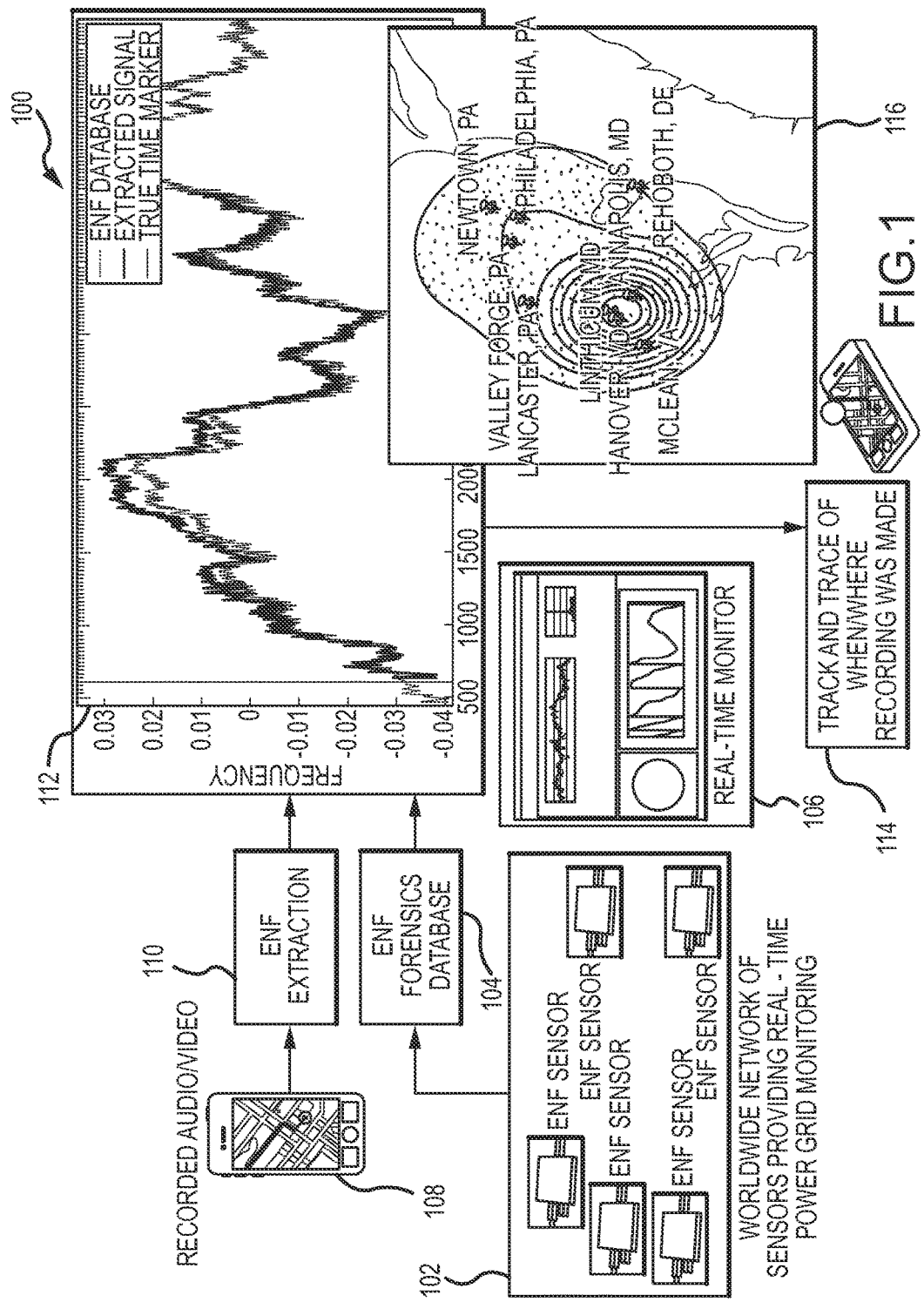
FIG. 1 is a schematic representation of an embodiment of a system for applying ENF forensic techniques to determine characteristics associated with an audio and/or video recording such as when and where the recording was made.

FIG. 1 illustrates a system 100 that applies ENF forensic techniques to determine characteristics associated with a recording 108 such as a time (e.g., when the recording was made) and/or a location (e.g., where the recording was made). The recording 108 may, for example be an audio recording, a video recording, or both (e.g., an audio-visual recording). The original of the recording 108 may be in a digital format, or if in an analog format, it may be sampled to obtain a digital replica for subsequent analysis.

System 100 may include a plurality of ENF sensors 102. The ENF sensors 102 may be utilized to collect powerline data from various powerline locations (e.g., from local power grids throughout the world). In this regard, the ENF sensors 102 may be located to collect powerline data at different locations within one or more electrical power grids.

The collected powerline data may be stored in an ENF Forensic Database 104 (e.g., on a server computer system). In this regard, the ENF sensors 102 may communicate the collected powerline data to the ENF forensic database 104. In addition to being stored in the ENF Forensic database 104, when desired, the powerline data may be displayed in real-time time on a monitor 106. The powerline data 106 that is collected by the ENF sensors 102 and stored in the ENF Forensic Database 104 may comprise a plurality of data points representing changes within electric fields associated with an electrical power grid over time and may also include information indicating time(s) at which specific data points were obtained and information identifying a location in the electrical power grid from which the specific data points were obtained. Collecting such information facilitates subsequent use of the powerline data 104 in determining a time and/or a location of the recording 108 based on a comparison with the powerline data.

The system 100 may also include an ENF extraction processing module 110. The audio and/or video recording 108 may be directed to the ENF extraction processing module 110 for extraction of ENF content coupled into the audio and/or video recording 108. In this regard, the ENF extraction processing module 110 may include at least one processor and computer program code executable by the at least one processor to receive the recording 108 and to apply a digital filter to the recording 108 to extract the ENF content from the recording 108.

The system 100 may also include a comparison processing module 112. The extracted ENF content may be directed to comparison processing module 112 for comparison with collected powerline data retrieved from the ENF Forensic Database 104 (e.g. by requesting the powerline data from a computer server on which the ENF Forensic database is stored). The comparison processing module 112 may include at least one processor and computer program code executable by the at least one processor to compare the extracted ENF content with the powerline data retrieved from the ENF forensic database to identify a best match between the extracted content and at least a portion of the powerline data. In this regard, the computer program code executable by the at least one processor to compare the extracted ENF content with the retrieved powerline data may implement a statistical data analysis process to identify the at least a portion of the powerline data that is the best match for the extracted ENF content. Appropriate statistical data analysis processes may, for example, include exploitation of cyclostationarity, higher-order statistics, and Principal Components Analysis.

The comparison processing module 112 may output information 114 such as, for example, information tracking and tracing when and where the recording was made. The system 100 may also include monitor 116 communicatively coupled to the at least one processor of the comparison processing module 112. As shown in FIG. 1 monitor 116 may be separate from monitor 106, but in other embodiments monitors 106, 116 may comprise a single monitor. The information 114 output by the comparison processing module 112 may be visually displayed on monitor 116. Also, a visual representation of the extracted ENF content together with the at least a portion of the powerline data identified as being the best match may be displayed on monitor 116.

Figure 2:
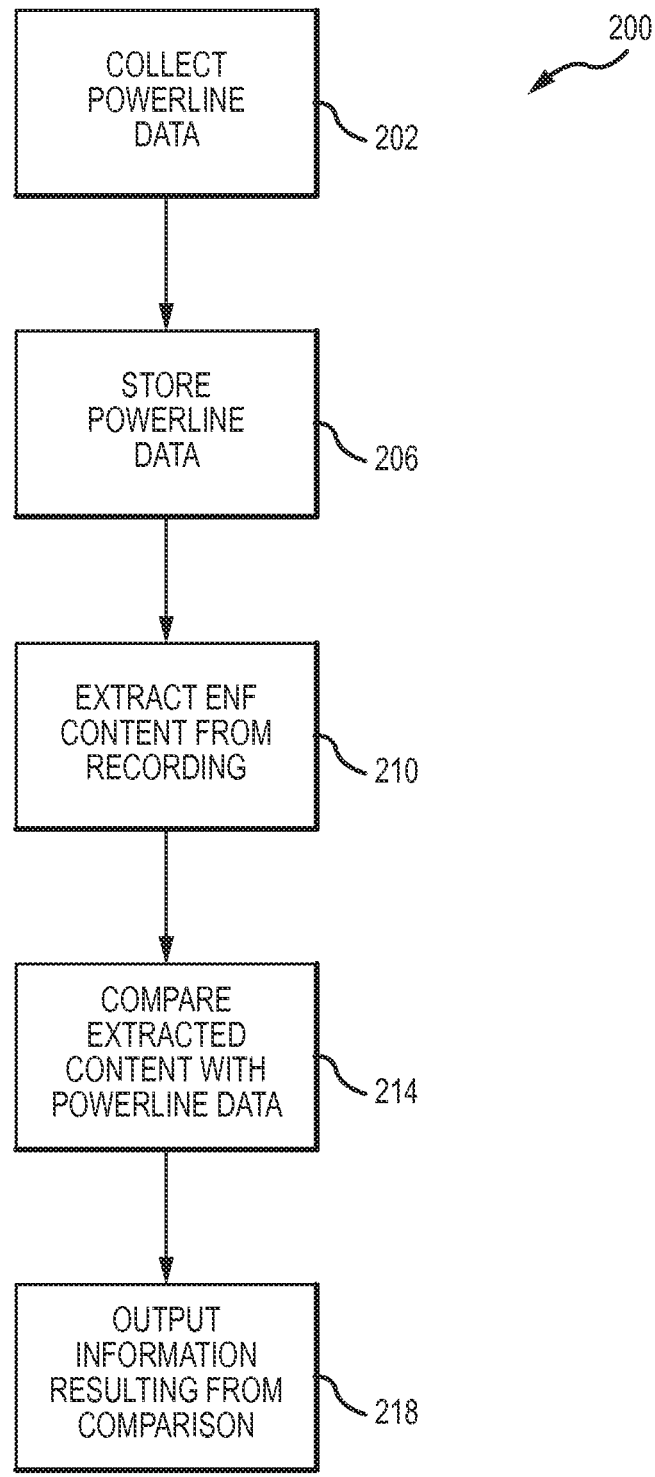
FIG. 2 is a schematic representation of an embodiment of a method for applying ENF forensic techniques to determine characteristics associated with an audio and/or video recording such as when and where the recording was made.

FIG. 2 shows one embodiment of a method 200 to determine characteristics associated with a recording 208 such as a time (e.g., when the recording was made) and/or a location (e.g., where the recording was made). The recording 208 may, for example be an audio recording, a video recording, or both (e.g. an audio-visual recording). The original of the recording 208 may be in a digital format, or if in an analog format, it may be sampled to obtain a digital replica for subsequent analysis.

The method 200 may include step 202 in which powerline data is collected from various powerline locations (e.g., from local power grids throughout the world). In this regard, the powerline data may be collected at different locations within or more electrical power grids using a plurality of ENF sensors and communicated from the plurality of ENF sensors to an ENF forensic database.

In step 206, the powerline data is stored in an ENF forensic database. The powerline data that is collected and stored in steps 202 and 206 may comprise a plurality of data points representing changes within electric fields associated with the one or more electrical power grids over time and including at least one of information indicative of times at which specific data points were obtained and information identifying a location in the one or more electrical power grids from which the specific data points were obtained. When needed, the powerline data may be retrieved from ENF forensic database (e.g., upon request made to a computer server system on which the ENF forensic database is stored). The powerline data may also be displayed on a monitor in real-time as it is collected and/or after being retrieved from the ENF forensic database.

In step 210, the recording 208 is processed extract ENF content coupled into the recording 208. In this regard, step 210 may be accomplished by executing computer program code with at least one processor to receive the recording 208 and to digitally filter the recording 208 to extract the ENF content from the recording.

In step 214, the extracted ENF content is compared with powerline data retrieved from the ENF forensic database. In this regard, step 214 may be accomplished by executing computer program code with at least one processor to compare the extracted ENF content with the powerline data retrieved from the ENF forensic database to identify a best match between the extracted content and at least a portion of the powerline data. A statistical data analysis process may be implemented to identify the at least a portion of the powerline data that is the best match for the extracted ENF content. Appropriate statistical data analysis processes may, for example, include exploitation of cyclostationarity, higher-order statistics, and Principal Components Analysis.

In step 218, information based on the comparison with the powerline data is output. The information that is output may include one or more of a time at which the recording was made and a location where the recording was made. Furthermore, step 218 may also include displaying a visual representation of the extracted ENF content together with the portion of the powerline data identified as being the best match on a monitor.

Figure 3:
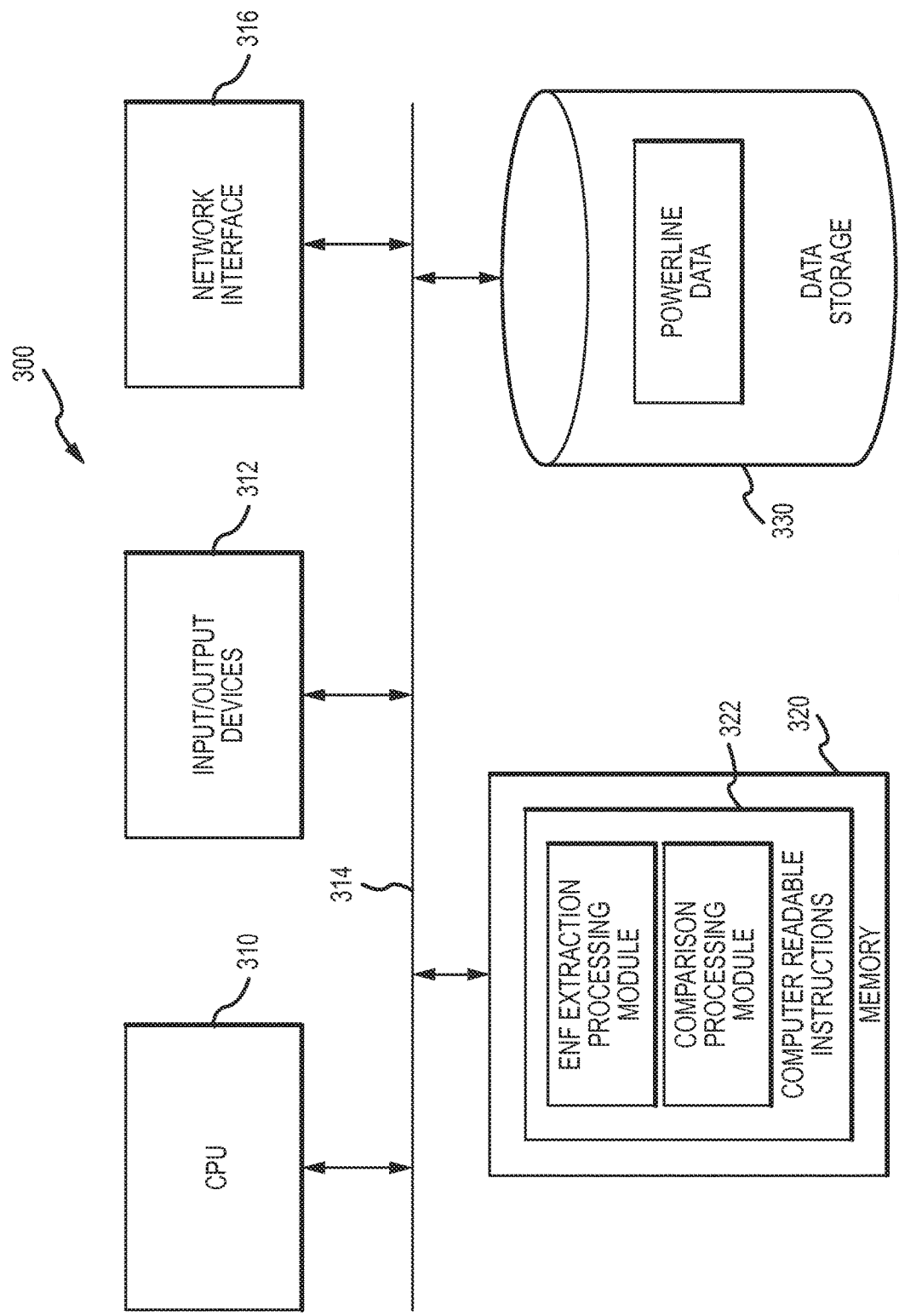
FIG. 3 shows one embodiment of a computer system 300 that may be used to implement one or more portions of a system 100 or a method 200 such as illustrated in FIGS. 1 and 2, respectively.

FIG. 3 shows one embodiment of a computer system 300 that may be used to implement one or more portions of a system 100 or a method 200 such as illustrated in FIGS. 1 and 2, respectively. The system 300 may include a central processing unit 310 (also referred to herein as processor 310) logically connected to one or more input/output devices 312 via a system bus 314. The input/output devices 312 may include, for example, a keyboard, mouse, touch screen, display, printer and the like. The system 300 may also include a network interface 316 logically connected to the system bus 314 that permits the system 300 to communicate with other network connected devices via a data communications network (not shown).

The system 300 may also include a memory 320 logically connected to the processor 310 via the system bus 314. The memory 320 may include a set of computer readable instructions 322 that are executable by the processor 310. In this regard, the computer readable instructions 322 may be loaded into the memory 320 prior to and/or during execution thereof by the processor 310 from one or more data storage devices 330. As illustrated, the data storage device(s) 330 may be logically connected to the memory 320 directly via the system bus 314. In other embodiments, one or more of the data storage devices 330 may be logically connected to the memory 320 indirectly via the system bus 314, the network interface 316, and a network. The data storage device(s) 330 may comprise a non-transitory computer usable medium having computer program code embodied therein. Examples of such computer usable mediums may include, without limitation, hard disk drives, optical disks readable by optical drives, flash drives, floppy disks readable by floppy drives, and remote server computers.

The computer readable instructions 322 on the memory 320 may include executable program code implementing a set of logical rules defining the ENF extraction processing module and the comparison processing module. In this regard, various programming techniques can be utilized by a software engineer to prepare the set of logical rules in appropriate executable program code.

During execution by the processor 310, the computer readable instructions 322 defining the ENF extraction processing module may cause the processor 310 to retrieve powerline data 340. The powerline data 340 may, as illustrated, be stored on the one or more data storage devices 330 logically connected to the processor 310 via the system bus 314. Some or all of the powerline data 340 may also be stored on a data storage device (e.g., a separate computer server) outside of the system 300 and accessible to the processor 310 via the system bus 314, the network interface 316 and a network.

The information generated by the comparison processing module may be written by the processor 310 to the memory 320 and/or to the data storage device(s) 330. The information may also be output via one of the input/output devices 312 (e.g. via a printer or a display) to a user of the system 300.

As mentioned, in one embodiment the computer readable instructions 322 may be embodied on a non-transitory computer usable medium, and as such may be considered to comprise a computer program product. The medium and the computer program code embodied thereon may be of a type specifically designed and constructed for the purposes of accomplishing the requirements of ENF extraction and comparison processing, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in special purpose logic circuitry, e.g., an FPGA (field programmable gate array) or an ASIC (application-specific integrated circuit) in place of, or in combination with, machine-executable software instructions.

As also discussed previously, the various modules and the like disclosed herein may be in the form of any appropriate combination of hardware, software, middleware, firmware and/or the like operable to carry out the various functionalities disclosed herein. For instance, such software, middleware and/or firmware may be implemented as one or more computer program products, i.e., one or more modules of computer program instructions encoded on a computer-readable medium for execution by one or more processors or processing modules, or to control the operation of, one or more data processing apparatuses. For example, the extraction processing module and/or the comparison processing module may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. In addition to hardware, the system 300 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to provide the extraction and comparison functionalities disclosed herein) may be written in any form of programming language, including compiled or interpreted languages, and may be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by an information flow network.

The block diagrams, processes, protocols and logic flows described in this specification can be performed by one or more programmable processors executing one or more computer programs to perform functions by operating on input data and generating output. The processes and logic flows may also be performed by, and apparatuses may also be implemented as, special purpose logic circuitry, e.g., an FPGA and/or an ASIC. Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

The foregoing description of the present disclosure has been presented for purposes of illustration and description. Furthermore, the description is not intended to limit the disclosure to the form disclosed herein. For example, although portions of the ENF Forensic system and method features and aspects may be described and depicted herein in connection with particular devices (e.g., a computer, processor, or an embedded computing device), such features and aspects are not necessarily limited to implementation on such devices only and may be implemented on devices from other manufacturers running other various operating systems.

Consequently, variations and modifications commensurate with the above teachings, and skill and knowledge of the relevant art, are within the scope of the present disclosure. The embodiments described hereinabove are further intended to explain best modes known of practicing the disclosure and to enable others skilled in the art to utilize the disclosure in such, or other embodiments and with various modifications required by the particular application(s) or use(s) of the present disclosure. While various embodiments of the present disclosure have been described in detail, further modifications and adaptations of the disclosure may occur to those skilled in the art. However, it is to be expressly understood that such modifications and adaptations are within the spirit and scope of the present disclosure.

What is claimed is:

1. A system comprising:
an electric network frequency (ENF) forensic database storing powerline data collected from at least one electrical power grid, the powerline data comprising a plurality of data points representing changes within electric fields associated with at least one electrical power grid over time and including at least one of information indicative of times at which specific data points were obtained and information identifying a location in the at least one electrical power grid from which the specific data points were obtained;
an ENF extraction processing module extracting ENF content coupled into a recording; and
a comparison processing module comparing the extracted ENF content with powerline data retrieved from the ENF forensic database and outputting information including one or more of a time during which the recording was made and a particular location where the recording was made based on the comparison with the powerline data, wherein the comparison processing module further compares the extracted ENF content with the powerline data retrieved from the ENF forensic database to identify a best match between the extracted content and at least a portion of the powerline data and displays a visual representation of the extracted ENF content together with the at least a portion of the powerline data identified as being the best match.

2. The system according to claim 1, wherein the recording comprises one of an audio recording, a video recording and an audio-visual recording.

3. The system according to claim 1, further comprising:
a plurality of ENF sensors collecting the powerline data at different locations within or more electrical power grids, wherein the ENF sensors communicate the collected powerline data to the ENF forensic database.

4. The system according to claim 1, further comprising:
a computer server system including a non-transitory data storage medium on which the ENF forensic database is stored, the computer server system retrieving the powerline data from the ENF forensic database upon request from said comparison module.

5. The system according to claim 4, further comprising:
a monitor communicatively coupled to the computer server system, the monitor displaying the powerline data stored in the ENF forensic database.

6. The system according to claim 1, wherein the ENF extraction processing module comprises:
at least one processor; and
computer program code executable by the at least one processor to receive the recording and to filter the recording to extract the ENF content therefrom.

7. The system according to claim 1, wherein the comparison processing module comprises:
at least one processor.

8. The system according to claim 7, further comprising:
a monitor communicatively coupled to the at least one processor of the comparison processing module, the monitor displaying the visual representation of the extracted ENF content together with the at least a portion of the powerline data identified as being the best match.

9. The system according the claim 7, wherein the computer program code executable by the at least one processor to compare the extracted ENF content with the powerline data retrieved from the ENF forensic database implements a statistical data analysis process to identify the at least a portion of the powerline data that is the best match for the extracted ENF content.

10. The system according the claim 9, wherein the statistical data analysis process comprises at least one of exploitation of cyclostationarity, higher-order statistics, and Principal Components Analysis.

11. A method comprising:
storing powerline data collected from at least one electrical power grid in an electric network frequency (ENF) forensic database, the powerline data comprising a plurality of data points representing changes within electric fields associated with the at least one electrical power grid over time and including at least one of information indicative of times at which specific data points were obtained and information identifying a location in the at least one electrical power grid from which the specific data points were obtained;
processing a recording to extract ENF content coupled into the recording; and
comparing the extracted ENF content with powerline data retrieved from the ENF forensic database, wherein comparing the extracted ENF content with powerline data retrieved from the ENF forensic database further comprises identifying a best match between the extracted content and at least a portion of the powerline data;
outputting information including one or more of a time at which the recording was made and a particular location where the recording was made based on the comparison with the powerline data; and
displaying a visual representation of the extracted ENF content together with the at least a portion of the powerline data identified as being the best match.

12. The method according to claim 11, wherein the recording comprises one of an audio recording, a video recording and an audio-visual recording.

13. The method according to claim 11, further comprising:
collecting the powerline data at different locations within or more electrical power grids using a plurality of ENF sensors; and
communicating the collected powerline data from the plurality of ENF sensors to the ENF forensic database.

14. The method according to claim 11, wherein the ENF forensic database is stored on a non-transitory data storage medium of a computer server system, and wherein the method further comprises:
retrieving the powerline data from the ENF forensic database upon request made to the computer server system.

15. The method according to claim 14, further comprising:
displaying the powerline data stored in the ENF forensic database on a monitor communicatively coupled to the computer server system.

16. The method according to claim 11, wherein the processing the recording to extract ENF content comprises:
executing computer program code with at least one processor to receive the recording and to filter the recording to extract the ENF content therefrom.

17. The method according to claim 11, wherein
the visual representation of the extracted ENF content together with the at least a portion of the powerline data identified as being the best match is displayed on a monitor communicatively coupled to at least one processor.

18. The method according the claim 11, further comprising:
implementing a statistical data analysis process to identify the at least a portion of the powerline data that is the best match for the extracted ENF content.

19. The method according the claim 18, wherein the statistical data analysis process comprises at least one of exploitation of cyclostationarity, higher-order statistics, and Principal Components Analysis.

* * * * *